(12) United States Patent
Coskun et al.

(10) Patent No.: US 10,560,526 B2
(45) Date of Patent: *Feb. 11, 2020

(54) STATE MANAGEMENT IN DISTRIBUTED COMPUTING SYSTEMS

(71) Applicant: Microsoft Technology Licensing, LLC, Redmond, WA (US)

(72) Inventors: Mert Coskun, Kirkland, WA (US); Mihail Tarta, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/137,912

(22) Filed: Sep. 21, 2018

(65) Prior Publication Data

US 2019/0089781 A1 Mar. 21, 2019

Related U.S. Application Data

(63) Continuation of application No. 14/750,931, filed on Jun. 25, 2015, now Pat. No. 10,110,673.

(60) Provisional application No. 62/153,928, filed on Apr. 28, 2015.

(51) Int. Cl.
*G06F 15/16* (2006.01)
*H04L 29/08* (2006.01)
*G06F 9/445* (2018.01)

(52) U.S. Cl.
CPC ........ *H04L 67/1095* (2013.01); *G06F 9/4451* (2013.01)

(58) Field of Classification Search
CPC .................................................. H04L 67/1095
USPC ........................................................... 709/219
See application file for complete search history.

(56) References Cited

U.S. PATENT DOCUMENTS

| | | | | |
|---|---|---|---|---|
| 2003/0182464 | A1* | 9/2003 | Hamilton | G06F 9/546 719/314 |
| 2012/0005254 | A1* | 1/2012 | Riley | G06F 9/546 709/201 |

OTHER PUBLICATIONS vFabric GemFire User's Guide, Feb. 18, 2014, VMWare, VMWare vFabric Gem 7.0, All Pages (Year: 2014).*

* cited by examiner

*Primary Examiner* — Hee Soo Kim
(74) *Attorney, Agent, or Firm* — Liang IP, PLLC

(57) ABSTRACT

Various techniques for distributed storage of state information in a computing fabric are disclosed herein. In one embodiment, a method includes executing a software application at a computing device of a computing fabric, and thus resulting in a change to a portion of a copy of state information associated with the software application stored in the computing device. The method also includes automatically replicating the change to the portion of the copy of state information stored on the computing device to one or more other computing devices in the computing fabric. The one or more other computing devices individually contain a copy of the state information associated with the software application.

20 Claims, 7 Drawing Sheets

STATE MANAGEMENT IN DISTRIBUTED COMPUTING SYSTEMS

CROSS-REFERENCE TO RELATED APPLICATION(S)

This application is a continuation application of and claims priority to U.S. patent application Ser. No. 14/750,931, filed Jun. 25, 2015, which is a non-provisional application of and claims priority to U.S. Provisional Application No. 62/153,928, filed on Apr. 28, 2015.

BACKGROUND

Cloud computing typically utilizes a collection of virtual machines or other remote servers, rather than local servers or personal computers, to process, manage, or store user data. A communications network can interconnect the remote servers as nodes to form a computing fabric. During operation, one or more nodes of the computing fabric can cooperate with one another to provide a distributed computing environment that facilitates execution of various software applications to provide desired computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

During operation, one or more nodes of a computing fabric can execute software applications to provide banking, e-commerce, content delivery, online gaming, or other desired computing services. Typically, the various nodes of the computing fabric rely upon a storage external to the computing fabric for storing various computing parameters, calculation results, or other suitable types of state information utilized by the software applications executing on the nodes. However, such an arrangement can be inefficient and unreliable. For instance, the external storage may be unavailable due to service failures or other causes. Even if the external storage is available, the nodes may experience high latencies or even failure in retrieving stored state information from the external storage due to, for example, network traffic and/or failures.

Several embodiments of the disclosed technology can address at least some of the foregoing difficulties by implementing facilities that support co-location of the executed software applications and associated state information to reduce network latencies. As a result, the need for external storage can be eliminated. In certain embodiments, the facilities can be configured to support automatic replication of state information across multiple nodes in the computer fabric. As such, the state information in the computing fabric can be highly available due to the availability of multiple copies. The replicated state information can also be persistent on the respective nodes, and thus the state information can be persistent even if the computing fabric is powered down. In particular embodiments, one example facility can be implemented as an application programming interface ("API") that supports distributed dictionaries, distributed versioned dictionaries, distributed queues, distributed blocking queues, distributed queues slim, distributed stacks, distributed bags, and/or other suitable data structures. In other embodiments, example facilities can also be implemented as application binary interfaces and/or other suitable components.

DETAILED DESCRIPTION

Certain embodiments of systems, devices, components, modules, routines, and processes for distributed storage of state information in a computing fabric are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-8.

As used herein, the term "computing fabric" generally refers to a computing system having a plurality of nodes interconnected by a communications network in a "weave" or other suitable configurations. A "node" in a computing fabric generally refers to a computing element. In certain embodiments, a computing element can include a physical server with one or more computing processors, memory devices, and/or peripherals. In other embodiments, a computer element can include a system, application, or other suitable types of virtual machine with virtualized processor, memory, and/or storage devices. Nodes of a computing fabric can be interconnected by a physical computer network and/or one or more virtual computer networks.

Also used herein, a "software application" generally refers to one or more programs configured to perform a set of coordinated functions, tasks, or activities to generate one or more parameters, indicators, and/or other suitable types of results. One example software application can include a word count application configured to parse a text string or passage and determine a total number of particular words in the string or passage. Other example software applications can include those designed for banking, e-commerce, content delivery, online gaming, and/or other suitable computing services.

Also used herein, the term "state information" or "state" generally refers to any information that a software application can access at a given instant in time. In certain embodiments, state information can include the all information or the entire state that the software application can access. In other embodiments, state information can also include a change or difference of at least a part of the information. For example, the word count application described above can generate and/or otherwise have access to a count variable that contains a value representing a total number of particular words in the string or passage. The value of the count variable is a state or contains state information associated with the word count application, and can be replicated onto additional nodes in a computing fabric, as described in more detail below.

Figure 1:
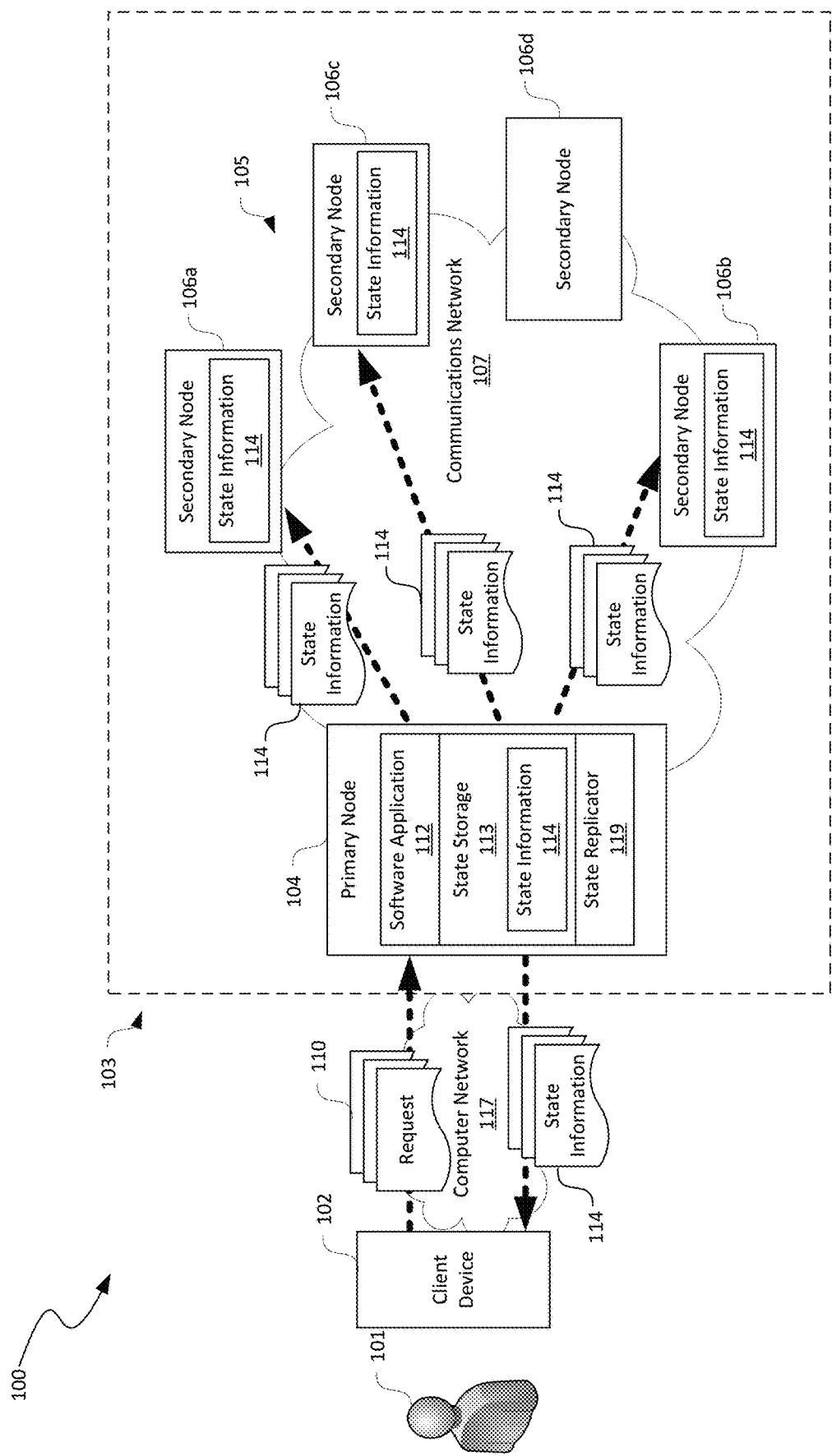
FIGS. 1 and 2 are schematic diagrams illustrating a computing framework having a computing fabric with distributed storage of state information in accordance with embodiments of the disclosed technology.

FIG. 1 is a schematic diagram illustrating a computing framework 100 having a computing fabric with distributed storage of state information in accordance with embodiments of the disclosed technology. As shown in FIG. 1, the computing framework 100 can include a client device 102 and a computing fabric 103 interconnected by a computer network 117. Even though various embodiments of the technology are described below with reference to state information, in other embodiments, similar techniques may also be implemented for distributed storage of user data, enterprise data, and/or other suitable types of digital data organized into files, directories, subdirectories, etc.

The computer network 117 can include the Internet, a local area network, a metropolitan area network, a wide area network, and/or other suitable types of network. The client device 102 can include a desktop, a laptop, a tablet, a smartphone, and/or other suitable types of computing device. One example computing device is described below in more details with reference to FIG. 8.

As shown in FIG. 1, the computing fabric 103 can include a plurality of nodes 105 interconnected by a communications network 107. In certain embodiments, the nodes 105 can be interconnected in a weave configuration. In other embodiments, the nodes 105 can be interconnected in a ring, a star, or other suitable types of configuration. In FIG. 1, five nodes 105 (i.e., a primary node 104 and four secondary nodes 106a-106d) are shown. In other embodiments, the computing fabric 103 can also include two, three, four, six, or any other suitable number of nodes 105.

The communications network 107 can include any suitable types of network. For example, in one embodiment, the communications network 107 can include an Ethernet or Fast Ethernet network having routers, switches, load balancers, firewalls, and/or other suitable network components. In other embodiments, the communications network 107 can also include an InfiniBand network with corresponding network components. In further embodiments, the communications network 107 can also include a combination of the foregoing and/or other suitable types of computer networks.

The individual nodes 105 can include a physical server or a virtual machine hosted on a physical server. As such, the individual nodes 105 can include one or more physical or emulated processors and memory devices that contains instructions for execution by the one or more physical or emulated processors to access, generate, and/or otherwise manipulate associated state information 114. For example, the primary node 104 (or any one of the first or second secondary node 106a, 106b) can be configured to execute the word count application described above and provide the total number of particular words or other state information to the client device 102. The physical server can be any suitable types of computing device, one example of which is described below with reference to FIG. 8.

In the illustrated embodiment, the nodes 105 are designated as a primary node 104 and first, second, third, and fourth secondary nodes 106a-106d, respectively. Such designations are for convenience of description. In certain embodiments, the primary node 104 and the secondary nodes 106a-106d can be generally similar in components and functions. In other embodiments, the primary node 104 and the secondary nodes 106a-106d can have different configurations, components, and/or functions. In one embodiment, the primary node 104 is designated by an administrator (e.g., a user 101) via the client device 102. In another embodiment, the nodes 105 can elect one of the nodes 105 to be the primary node 104. In further embodiments, more than one of the nodes 105 may be designated, elected, or otherwise identified as the primary node(s) 104 configured for failover and/or other suitable backup purposes.

The primary node 104 (and the secondary nodes 106a-106d) can be configured to store the state information 114 as distributed data structures in the computing fabric 103, and thus eliminate the need for an external repository. For example, as shown in FIG. 1, the primary node 104 can be configured to execute a software application 112 (e.g., the word count application) that can access, modify, or change at least a portion of associated state information 114 (e.g., numbers of particular words) stored in a state storage 113 of the primary node 104.

The primary node 104 can also include a state replicator 119 configured to replicate a modification or change to at least a portion of the stored state information 114 on the primary node 104 to select secondary nodes 106a-106c. For instance, when the primary node 104 executes the word count application, at least one of the stored numbers of particular words can be incremented or otherwise modified. Such a modification can be stored in the primary node 104, and automatically replicated to one or more of the secondary nodes 106a-106d of the computing fabric 103, providing high availability and fault tolerance storage of the state information 114, as described in more detail below.

Example functions and/or operations implemented as an API related to a distributed dictionary, a distributed queue, and a distributed versioned dictionary are described below for illustration purposes. In other embodiments, similar or different techniques may be used to implement the state information 114 as distributed blocking queues, distributed queues slim, distributed stacks, distributed bags, and/or other suitable types of data structures. In any of these embodiments, the various functions and/or operations can be implemented to return a conditional result, a Boolean value, or other suitable results. For example, a conditional result for a "TryGetValueAsync" described below can include (1) a Boolean value indicating whether a requested piece of state information exists or not, and (2) the value of the requested piece of state information if it does exists. In another example, the value of the request piece of state information can be a null value if it does not exist. In any of the foregoing embodiments, compute and state information are co-located such that the state information is maintained locally within each computing service replica using the computing fabric 103.

Embodiments of the distributed data structures described below can be helpful for developers by providing familiar data structures associated with existing programming languages such as C# and Java but with scalability and distributed functionality. Embodiments of the distributed data structures can also provide transaction support that allows easy management of state by providing atomicity, durability, isolation, and consistency, as described in more detail below.

Distributed Dictionary

The term "dictionary" as used herein generally refers to an associative array, map, or symbol table having a collection of key-value pairs in which each key appears just once in the collection. A key-value pair (and any associated information) can be referred to as an "entry" of a dictionary. For example, in a dictionary associated with a word count application described above, a key-value pair can include the word "walk" and an integer value of 2 indicating that the word count application has detected the word "walk" twice in a target string or passage.

In certain embodiments, a distributed dictionary can be implemented using templates. In one example, a distributed dictionary can utilize a default key comparer, a default key partitioner, and default key and value byte converters as follows:

DistributedDictionary<TKey,TValue> where "TKey" is the key type, and "TValue" is the value type associated with the key. In another example, a distributed dictionary can also utilize a default key comparer, a default key partitioner, and user-defined key and value byte converters as:

DistributedDictionary<TKey,TValue,TKeyByteConverter,TValueByteConverter> where "TKeyByteConverter" specifies a user-defined key byte converter, and "TValueByteConverter" specifies a user-defined value byte converter. The byte converter is useful for persistence of state information. For instance, the byte converter is in application code, and can also be utilized to provide compression and/or encryption that may be required by an application. In yet another example, a distributed dictionary can also utilize a user-defined key comparer, a key partitioner, and key and value byte converters as follows:

DistributedDictionary<TKey,TValue,TKeyCom parer, TKeyEqualityCom parer,TKeyRangePartitioner, TKeyByteConverter,TValueByteConverter> where "TKeyComparer" is a user-defined key comparer; "TKeyEqualityComparer" is a user-defined key equality comparer; and "TKeyRangePartitioner" is a user-defined range partitioner. In further embodiments, a distributed dictionary may be implemented using other suitable types of templates.

In certain embodiments, a distributed dictionary can be implemented to allow various operations, several examples of which are described below for illustration purposes. The various operations may be included in, for example, the software application 112 (e.g., the word count application) for execution by a processor or other suitable processing components of the primary node 104 and/or any of the secondary nodes 106a-106d. In other embodiments, the distributed dictionary can be implemented to allow other suitable operations.

In certain embodiments, a distributed dictionary can be implemented to allow addition of one or more entries to the distributed dictionary. For example, in one embodiment, a distributed dictionary can be implemented to allow a try-to-add operation of an entry to a distributed dictionary on the primary node 104 utilizing a function call as follows:

TryAddAsync(TKey key,TValue value)

where "TryAddAsync" is the name of the function call that is configured to add to a "TValue" by "value" for a "TKey" having the value "key". In other embodiments, the function call can also be implemented to support a transaction operation as follows:

TryAddAsync(Transaction text,TKey key,TValue value)

where "text" is a transaction name, ID, or other associated value for "Transaction." The transaction operation can be configured to have multiple configurable isolation levels. A default isolation level may be configured for usability and/or performance. In other examples, the function call may be implemented to support other suitable operations.

When executing the foregoing function calls, the primary node 104 adds an entry to a copy of the distributed dictionary contained on the primary node 104 "value" for the corresponding "key." Also, the state replicator 119 (and/or other suitable components) of the primary node 104 can cause the same entry related to "TKey" and "TValue" to be added to copies of the distributed dictionaries on one or more select secondary nodes 106a-106d. In certain embodiments, the one or more secondary nodes 106a-106d can be selected randomly, based on a proximity to the primary node 104, based on a traffic condition in the communications network 107, or based on other suitable criteria. In the illustrated example, the first, second, and third secondary nodes 106a-106c are selected. As such, the state replicator 119 automatically transmits the state information 114 related to "TKey" and "TValue" to the first, second, and third secondary nodes 106a-106c with an instruction to add "value" for the corresponding "key" in copies of the distributed dictionary contained thereon.

Figure 2:
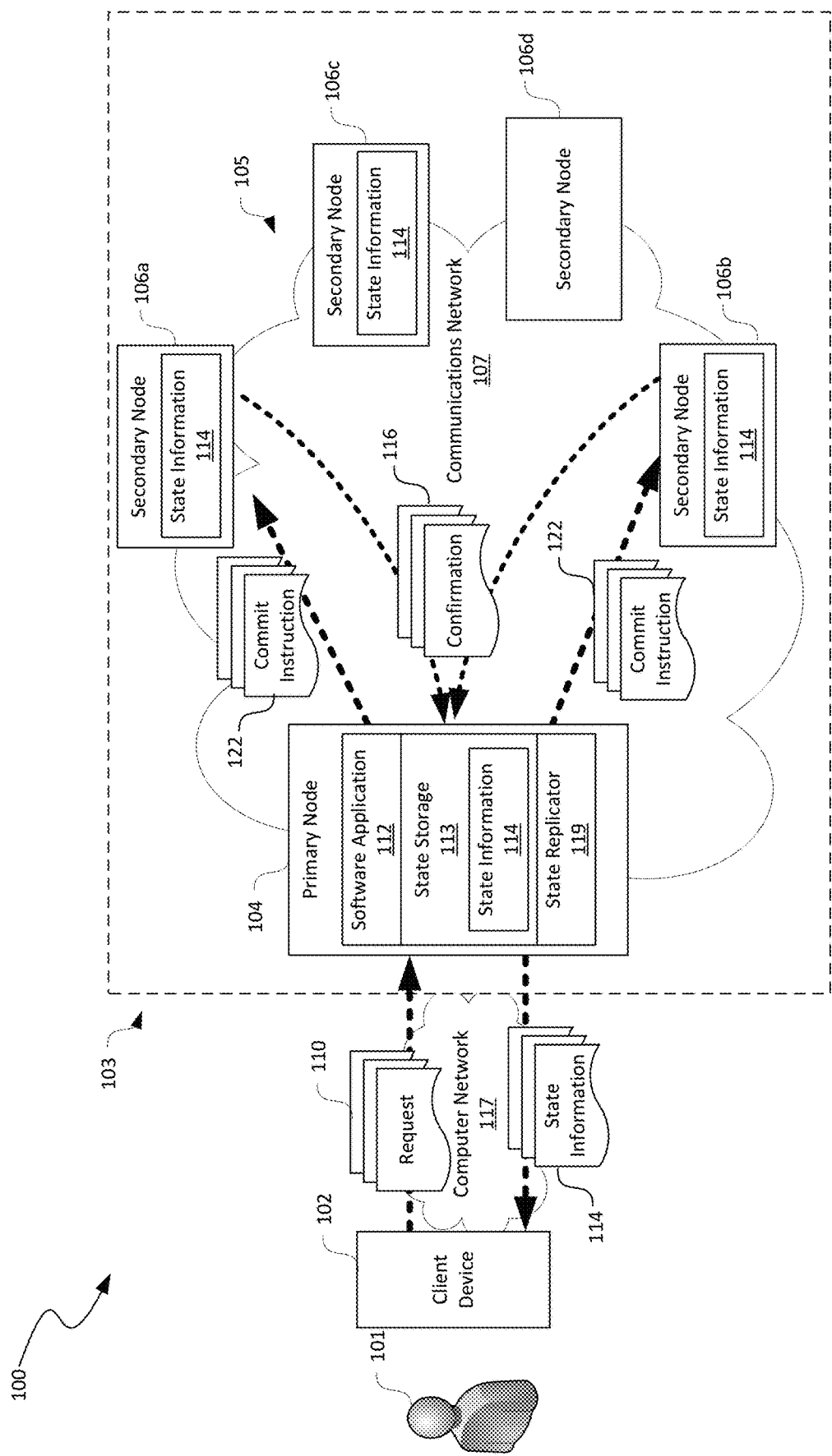

In response to receiving the transmitted state information 114 and instruction to add, the first, second, and third secondary nodes 106a-106c can then add "value" to "TValue" corresponding to "TKey" having the value "key." Subsequently, the first, second, and third secondary nodes 106a-106c can also generate and transmit a confirmation 116 indicating a successful completion, a failure, or other messages related to the requested operation, as shown in FIG. 2.

Refer back to FIG. 1, in certain embodiments, operations related to the distributed dictionary can be asynchronous, so that a number of blocked threads may be limited during input/output operations. For instance, in the illustrated example, when a processor 804 (FIG. 8) of the primary node 104 executes "TryAddAsync", the function call does not block other threads or operations that the processor 804 of the primary node 104 may be executing. Examples of such other operations can include, for instance, executing the word count application described above to process a new string or passage. As such, the primary node 104 may continue execution of other tasks without waiting for the replication process to complete.

In one embodiment, the TryAddAsync function call can also be implemented to include a cancellation token and a timeout threshold. For example, if the primary node 104 does not receive the confirmations 116 (FIG. 2) indicating a successful completion of replication within a predetermined period of time (e.g., 5 seconds), the TryAddAsync functional call may be canceled. In other embodiments, the function call may be canceled after a predetermined number of attempts or based on other suitable criteria. In further embodiments, the distributed dictionary can also be configured to support a locking mode in which various types of locks may be placed on a particular operation. For example, an update lock can be enabled when doing a read operation, which would prevent deadlocks by not allowing any other update lock to be granted while one is already granted. Such update locks can be asymmetric: update locks are granted when shared locks are held, but shared locks are not granted when update locks are held by a different transaction.

In any of the foregoing embodiments, the primary node 104 can also issue a commit instruction 122 to persistently store the replicated state information 114 on the one or more secondary nodes 106a-106d, as shown in FIG. 2. In one embodiment, the primary node 104 can receive confirmations 116 from the secondary nodes 106a-106d indicating that the replication operation has been completed successfully. In response to receiving such confirmations 116, the primary node 104 can issue the commit instruction 122 to persistently store the replicated state information 114 on, for example, a hard disk drive, a solid state drive, or other suitable persistent storage devices associated with the secondary nodes 106a-106d. In other embodiments, the primary node 104 can issue the commit instruction 122 when the confirmation 116 has been received form a majority or a target number of the secondary nodes 106a-106d. In further embodiments, the primary node 104 can issue the commit instruction 122 based on other suitable criteria.

In another embodiment, the distributed dictionary can be implemented to allow a try-to-get-value operation for retrieving an entry in the distributed dictionary from the primary node 104 and/or one or more secondary nodes 106a-106d as a function call as follows:

TryGetValueAsync(TKey key)

which returns a value corresponding to a TKey having a value of "key." In further examples, the distributed dictionary can also be implemented to allow a listing operation to list all values and keys in the distributed dictionary, to delete all keys and/or values in the distributed dictionary, and/or allow other suitable operations.

Distributed Queue

The term "queue" used herein generally refers to a collection of data items maintained in a first-in-first out order. One example operation on a queue can include an addition of one or more data items to a rear of the queue (referred to as "enqueue"). Another example operation on a queue can include inspecting a data item at a front of the queue (referred to as "TryPeek"). Yet another example operation on a queue includes removal of one or more data items from a front of the queue (referred to as "dequeue"). A "queue slim" generally refers to a queue-like data structure in which the first-in-first-out requirement of a queue is relaxed, for example, for certain portions of the data structure. A queue slim can ease the expense of transacting strict FIFO to protect again re-ordering of items when users are committing and aborting enqueue or dequeue transactions concurrently. Such strict FIFO ordering is important to some application (e.g. Stock Exchange) but not for others (e.g. Email delivery). By relaxing the ordering, concurrency of access to the queue may be increased. For example, multiple operations or threads may be performing enqueue or dequeue at the same time.

Figure 3:
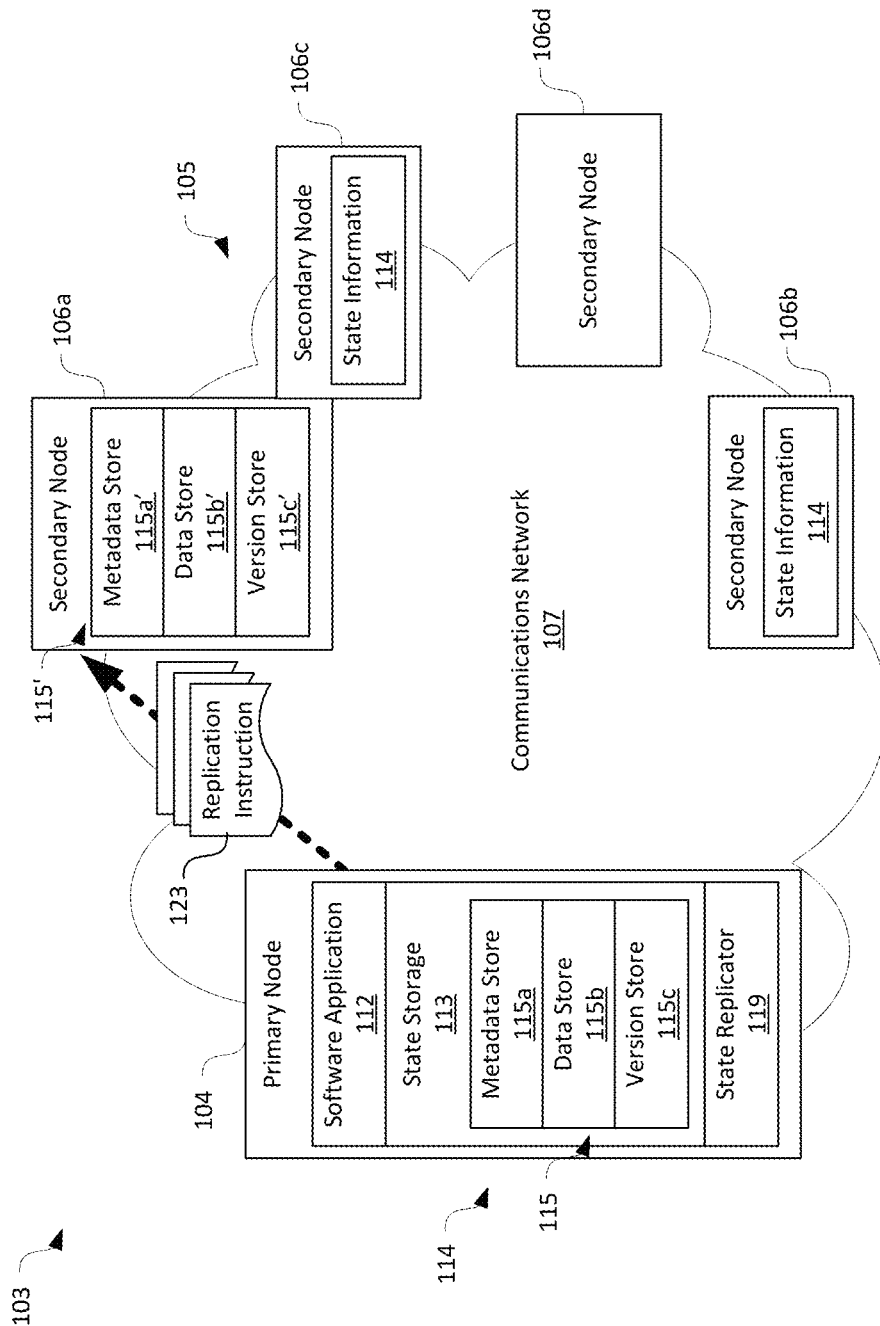
FIG. 3 is a schematic diagram illustrating a computing fabric implementing a distributed queue in accordance with embodiments of the disclosed technology.

In FIG. 3, the state information 114 is shown as a distributed queue 115 having a metadata store 115a, a data store 115b, and a version store 115c operatively coupled to one another at the primary node 104 and the first secondary node 106a. A copy of the metadata store 115a, the data store 115b, and/or the version store 115c can be stored on the other secondary nodes 106b-106d, or other suitable nodes 105 in the computing fabric 103. In other embodiments, the distributed queue 115 can include only the metadata store 115a and the data store 115b. In further embodiments, the distributed queue 115 can include additional and/or different stores and/or suitable components.

The metadata store 115a can be configured to store a pointer associated with a front (or "head") and a pointer associated with a rear (or "tail") of the distributed queue 115. The data store 115b can be configured to store data items in the distributed queue 115. Each of the data items can be associated with a particular pointer value. The version store 115c can be configured to store a version of the distributed queue.

In one example, the metadata stores 115a and 115a' can each include the following:

| Head pointer | 4 |
| Tail pointer | 7 |

Corresponding data stores 115b and 115b' can each include the following:

| 4 | Item 4 |
| 5 | Item 5 |
| 6 | Item 6 |
| 7 | Item 7 |

Thus, the metadata store 115a (or 115a') indicates that the distributed queue 115 (or 115') starts at a head pointer value of 4 and ends at a tail pointer value of 7. Thus, the distributed queue 115 include Items 4-7 each corresponding to a pointer value.

In one embodiment, the distributed queue 115 can be implemented to allow the primary node 104 to perform an asynchronous enqueue of one or more items to the distributed queue 115 by invoking a function call as follows:

EnqueueAsync(Transaction text,T new item)

where "text" is a transaction name, ID, or other suitable types of value associated with the transaction; and "new item" is to be added to the distributed queue 115. In response, "new item" can be enqueued on a copy of the distributed queue 115 on the primary node 104. Also, the state replicator 119 (and/or other suitable components) of the primary node 104 can issue a replication instruction 123 to replicate the enqueued "new item" in a copy of the distribute queue 115' on the first secondary node 106a (or other suitable nodes 105).

In response to receiving the replication instruction 123, the first secondary node 106a can be configured to read a tail pointer from the metadata store 115a'. If the tail pointer does not exist, a new tail pointer (NextTail) is set to a minimum pointer number plus 1; otherwise, the tail pointer is incremented by 1 as NextTail. Subsequently, the first secondary node 106a can add a new row in the data store 115b' with the pointer being NextTail and a corresponding value being "item." The tail pointer in the metadata store 115a' can then be set to NextTail. During the foregoing operations, the tail pointer in the metadata store 115a' can be locked such that no other enqueue can be performed on the distributed queue 115'.

Thus, subsequent to the replicated enqueue, the metadata store 115a' on the first secondary node 106a can include the following:

| Head pointer | 4 |
|---|---|
| Tail pointer | 8 |

Corresponding data store 115b' can include the following:

| 4 | Item 4 |
|---|---|
| 5 | Item 5 |
| 6 | Item 6 |
| 7 | Item 7 |
| 8 | "new item" |

As shown above, the "new item" has been added to the tail of the distributed queue 115' corresponding to a pointer value of 8.

In another embodiment, the distributed queue 115 can also be implemented to allow the primary node 104 to perform an asynchronous dequeue on the distributed queue 115 by invoking a function call as follows:

TryDequeueAsync(Transaction text)

where "text" is a transaction name, ID, or other suitable types of value associated with the transaction. The TryDequeueAsync function call attempts to remove a data item from the head of the distributed queue 115 on the primary node 104. In response, the primary node 104 can dequeue the distributed queue 115 contained therein.

The state replicator 119 on the primary node 104 can issue another replication instruction 123 to the first secondary node 106a to perform the same dequeue operation. In response to receiving the replication instruction 123, the first secondary node 106a can be configured to read the head pointer from the metadata store 115a'. If the head pointer does not exist, the head pointer ("CurrentHead") is set to a minimum pointer number plus 1; otherwise, CurrentHead is set to be the read head pointer value.

Subsequently, the first secondary node 106a can remove a row in the data store 115b' with the pointer being CurrentHead. The head pointer in the metadata store 115a' can then be set to CurrentHead plus 1. The first secondary node 106a can then return the data item in the removed row of the data store 115b' to the primary node 104. During the foregoing operations, the head pointer in the metadata store 115a' can be locked such that no other dequeue can be performed on the distributed queue 115'. Thus, subsequent to the dequeue, the metadata store 115a' on the first secondary node 106a can include the following:

| Head pointer | 5 |
|---|---|
| Tail pointer | 8 |

Corresponding data store 115b' on the first secondary node 106a can include the following:

| 5 | Item 5 |
|---|---|
| 6 | Item 6 |
| 7 | Item 7 |
| 8 | "new item" |

As shown above, the previous head of the distributed queue 115', i.e., Item 4 has been removed. The distributed queue 115' now includes Items 5-7 and new Item corresponding to pointer values of 5-8.

In yet another embodiment, the distributed queue 115 can be implemented to allow the primary node 104 to perform an asynchronous peek on the distributed queue 115' on the first secondary node 106a by invoking a function call 123 as follows:

TryPeekAsync(Transaction text)

where "text" is a transaction name, ID, or other suitable types of value associated with the transaction. The TryPeekAsync function call attempts to read a data item from the head of the distributed queue 115' on the first secondary node 106a. In response to receiving the function call 123, the first secondary node 106a can be configured to read the head pointer (i.e., 4) from the metadata store 115a' and return the value (i.e., "Value 4) corresponding to the head pointer, in the example discussed above.

In a further embodiment, the distributed queue 115 can be implemented to allow the primary node 104 to perform an asynchronous count operation on the distributed queue 115' on the first secondary node 106a by invoking a function call 123 as follows:

TryCountAsync( )

In response to receiving the function call 123, the first secondary node 106a can be configured to read the head pointer (i.e., 4), the tail pointer (i.e., 7), and calculate a difference between values of the tail pointer and head pointer (i.e., 7−4=3). The first secondary node 106a can then add 1 to the calculated difference and return the result (i.e., 4) as the number of items in the distributed queue 115' to the primary node 104.

Even though particular functions and/or operations related to the distributed queue 115 are described above, in other embodiments, other suitable functions and/or operations may also be implemented. In any of the foregoing embodiments, the distributed queue 115 can be configured to guarantee that $P1(t1)==P2(T2)$, if $P1(t1) \rightarrow P2(t1)$ and there exist no write operation W(t1) on the distributed queue Q that satisfies $P1(t1) \rightarrow W(t1) \rightarrow P2(t1)$. A TryPeek operation related to a transaction can return the same output as long as no other write operation occurred on the same queue that belongs to the same transaction. If Q={ } both P1 and P2 would indicate that queue is empty. If Q={ } both P1 and P2 would return the same item.

Also, a data item D1 (t1) with a pointer value t1 must have been enqueued before another data item $D2(t1)$ with a pointer value t2, if $D1(t1) \rightarrow D2(t1)$ and Q !={ }. Thus, item returned by D1 would have been enqueued before D2. If a transaction is to abort and be repeated, the values of D1 and D2 would be the same. Further, $D2(t1)$={ } if $D1(t1)$={ } if there exist no equeue operation E(t1) on queue Q that satisfies $D1(t1) \rightarrow W(t1) \rightarrow D2(t1)$. Thus, if a TryDequeue operation related to t1 outputs that the queue Q is empty, following dequeue would also output empty as long as there is no enqueue operation related to t1 that happened after D1 but before D2. Yet further, concurrent TryDequeue operations related to a pointer value tX would not block enqueue operations related to another pointer value tY as long as none of the dequeue operations output that the queue Q is empty.

Distributed Versioned Dictionary

For cloud services, abilities to perform auditing, validation, and compensations may be needed. As such, another type of state information 114 can include a distributed versioned dictionary, which is similar to a distributed dictionary described above, but with exposed versions. A "version" generally refers to an immutable or unchangeable state that is maintained along with each key change. A version may be added with various operations. For example, creating a key, updating a key, deleting a key, re-adding a key can all add a new version. An example version can contain a timestamp, a transaction ID that created the version, and a replication sequence number of the replication operation that was used to replicate that state change. Other things could be added to the version, such as the data loss number, used to distinguish between different incarnations of the state. Exposure of versions can be divided into three main categories:

Versioned reads: read operations that return a version value associated with a returned value Per row version chain queries: date, time, or version values can be used to obtain a chain of versions that a value in a specific row changed at a particular time interval;

A point in time snapshot: ability to obtain a state of the entire dictionary at a particular date, time, or version value.

In certain embodiments, the distributed versioned dictionary can be implemented generally similarly as the distributed dictionary described above, except the values corresponding to a particular key are never deleted. As such, the versioned chains of values stored in the distributed versioned dictionary are not truncated. This may cause resources at a particular node 105 to be exhausted. To at least ameliorate such a difficulty, the distributed versioned dictionary can be implemented to allow removal of versions older than a predetermined value as follows:

Task TrimAsync(Version trim BeforeVersion);

where "trimBeforeVersion" is a version value prior to which any corresponding values would be removed from the distributed versioned dictionary.

Embodiments of the distributed versioned dictionary can allow optimistic concurrency of operations for different computing services or entities. For instance, a first computing service (e.g., an accounting service) can obtain a piece of state information from a second computing service (e.g., a human resources service) regarding a mailing address of a particular employee for processing certain expense reports from the employee. Instead of locking the mailing address of the employee, the first computing service can process the expense reports based on a versioned mailing address of the employee. The first computing service can then complete the processing by sending a check to the versioned mailing address with a condition that the version of the mailing address has not changed; otherwise, the first computing service may reprocess the expense reports based on new versioned mailing address of the employee. As such, processing at the first and second computing services can be performed concurrently without undue interference from each other.

Figure 4:
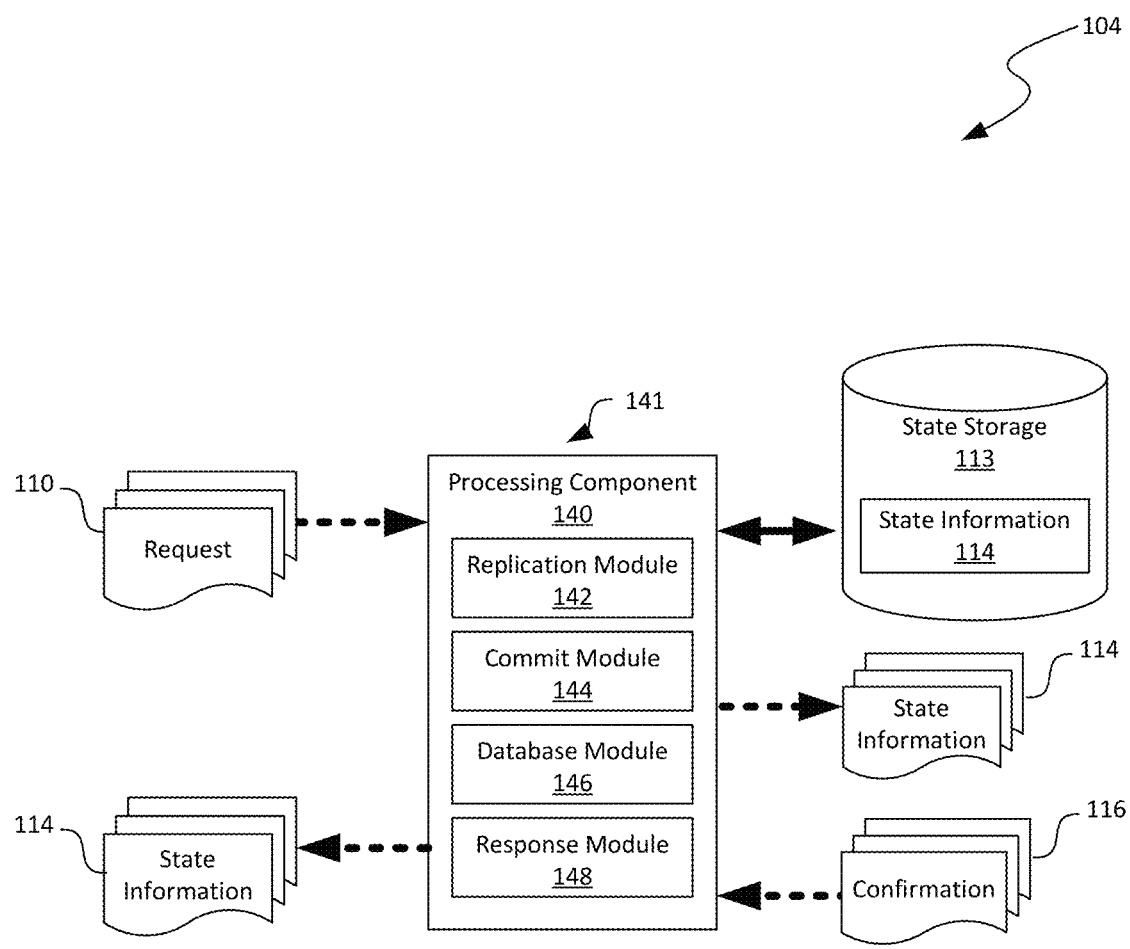
FIG. 4 is a block diagram showing software modules suitable for the primary node of FIGS. 1-3 and in accordance with embodiments of the disclosed technology.

FIG. 4 is a block diagram showing software modules 141 suitable for the primary node 104 of FIGS. 1-3 and in accordance with embodiments of the disclosed technology. In FIG. 4 and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Various implementations of the source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 4, the primary node 104 can include a processing component 140 coupled to a state storage 113. The state storage 113 can be configured to store the state information 114 and/or other suitable data as distributed dictionaries, distributed versioned dictionaries, distributed queues, distributed blocking queues, distributed queues slim, distributed stacks, distributed bags, and/or other suitable data structures. The processing component 140 can include a plurality of software modules 141 configured to facilitate distributed storage of the application image 112 in the computing fabric 103 (FIG. 1).

The software modules 141 can include a replication module 142, a commit module 144, a database module 146, and a response module 148 operatively coupled to one another. In one embodiment, all of the software modules 141 can reside on a single computing device (e.g., a network server). In other embodiments, the software modules 141 can also reside on a plurality of distinct computing devices. In further embodiments, the software modules 141 may also include interface modules, input/output modules, and/or other suitable modules (not shown).

In one embodiment, the replication module 142 can be configured to replicate one or more entries in a distributed dictionary or distributed versioned dictionary from a primary node 104 (FIG. 1) to one or more secondary nodes 106a-106d (FIG. 1). In another embodiment, the replication module 142 can be configured to replicate one or more rows in a distributed queue or distributed stack from the primary node 104 to one or more secondary nodes 106a-106d. In further embodiments, the replication module 142 can be configured to replicate at least a portion of the state information 114 in the primary node 104 to one or more secondary nodes 106a-106d. The commit module 144 can be configured to instruct one or more secondary nodes 106a-106d to persistently store at least a portion of the state information 114 replicated to the one or more secondary nodes 106a-106d.

The control module 146 can be configured to perform requested operations based on the received client request 110. For example, in one embodiment, if the received client request 110 (FIG. 1) indicates an entry read is requested from a distributed dictionary, the control module 146 can be configured to retrieve the requested entry. The response module 148 can then provide the retrieved entry to the requestor. In further embodiments, the control module 146 can be configured to perform other suitable operations.

Figure 5:
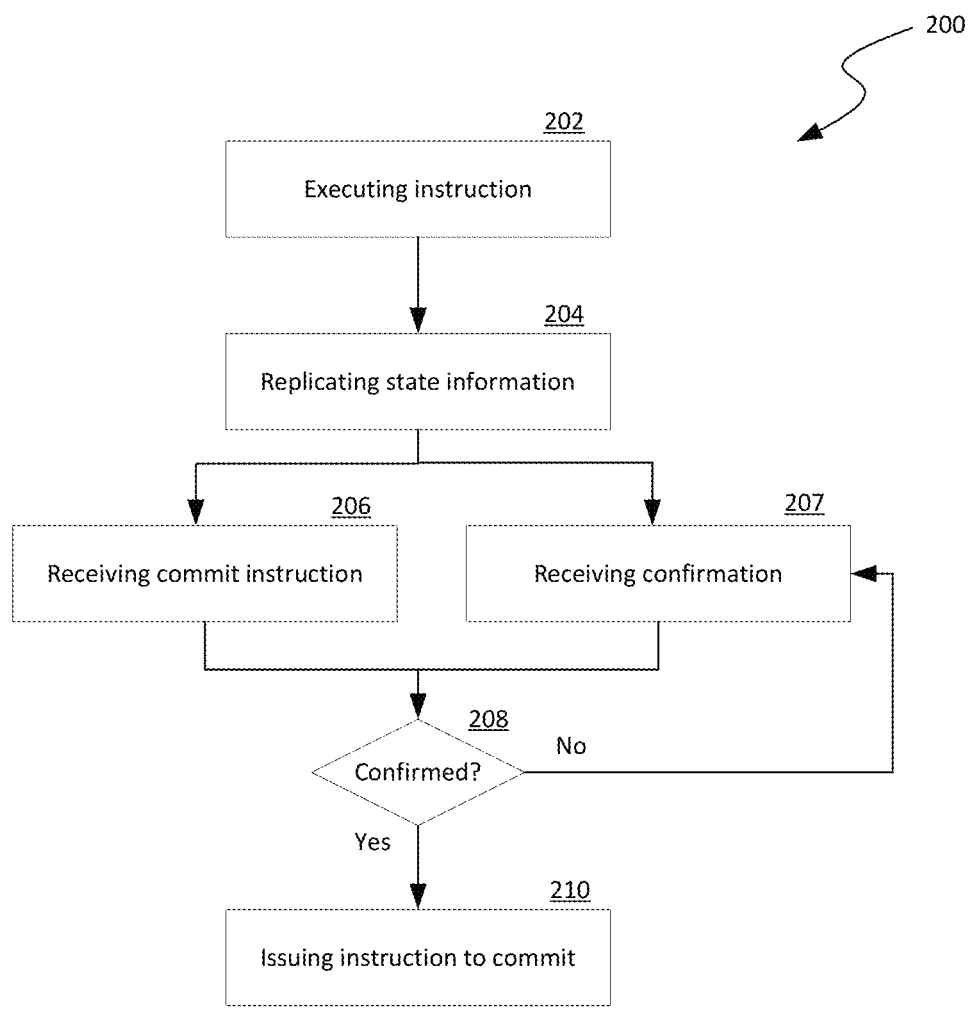
FIG. 5 is a flow diagram illustrating embodiments of a process of replicating statement information in a computing fabric in accordance with embodiments of the disclosed technology.

FIG. 5 is a flow diagram illustrating embodiments of a process 200 of distributed storage of state information in a computing fabric in accordance with embodiments of the disclosed technology. Even though various embodiments of the process 200 are described below with reference to the computing framework 100 of FIGS. 1-3 and the software modules 141 of FIG. 4, in other embodiments, the process 200 may be performed with other suitable types of computing frameworks, systems, components, or modules.

As shown in FIG. 5, the process 200 can include executing an instruction of a software application at stage 202. For example, in one embodiment, the executed instruction can be the TryAddAsync function described above with reference to a distributed dictionary. As a result of the execution, at least a portion of state information associated with the software application can be modified or changed. In another example, the executed instruction can include the EnqueueAsync function described above with reference to a distributed queue. In further examples, the executed instruction can include other suitable types of instructions that cause a modification or change to at least a portion of the state information 114 (FIG. 1).

The process 200 can then include replicating the modification or change to at least a portion of the state information 114 from, for example, the primary node 104 (FIG. 1) to one or more secondary nodes 106a-106d (FIG. 1) at stage 204. Example operations of replicating the modification or change to at least a portion of the state information 114 to one or more of the secondary nodes 106a-106d can include those described above with reference to the TryAddAsync and EnqueueAsync function calls. The process 200 can further include receiving a commit instruction at stage 206 and receiving confirmation determining that replication to one or more of the secondary nodes 106a-106d has completed successfully at stage 207. Even though the operations at stages 206 and 207 are shown in FIG. 5 as being parallel to each other, in other embodiments, these operations may be performed in a sequential, overlapping, or other suitable manners.

The process 200 can then include a decision stage 208 to determine if replication to one or more of the secondary nodes 106a-106d has completed successfully. In response to determining that replication to one or more of the secondary nodes 106a-106d has completed successfully, the process 200 can include issuing an instruction to commit to the one or more of the secondary nodes 106a-106d to persistently store the replicated state information 114; otherwise, the process reverts to receiving confirmation at stage 207.

Figure 6A:
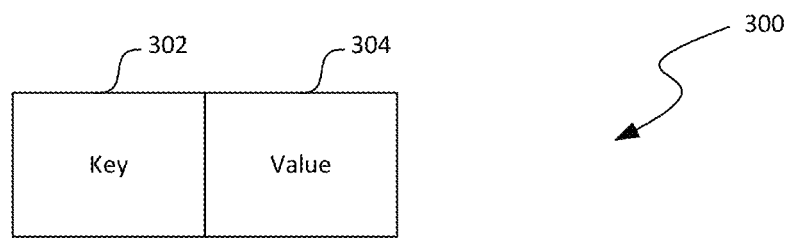
FIGS. 6A and 6B are example data schemas suitable for a distributed dictionary and a distributed versioned dictionary, respectively, in accordance with embodiments of the disclosed technology.

FIG. 6A is an example data schema 300 suitable for a distributed dictionary in accordance with embodiments of the disclosed technology. As shown in FIG. 6A, the data schema 300 can include a key field 302 and a value field 304. The key filed 302 can be configured to store a string value or other suitable types of key values. The value field 304 can be configured to store an integer, a floating point, or other suitable types of number. Even though particular fields are illustrated in FIG. 6A and other figures hereafter, in other embodiments, the data schema 300 and other data schemas described herein can include additional, less, and/or different fields.

Figure 6B:
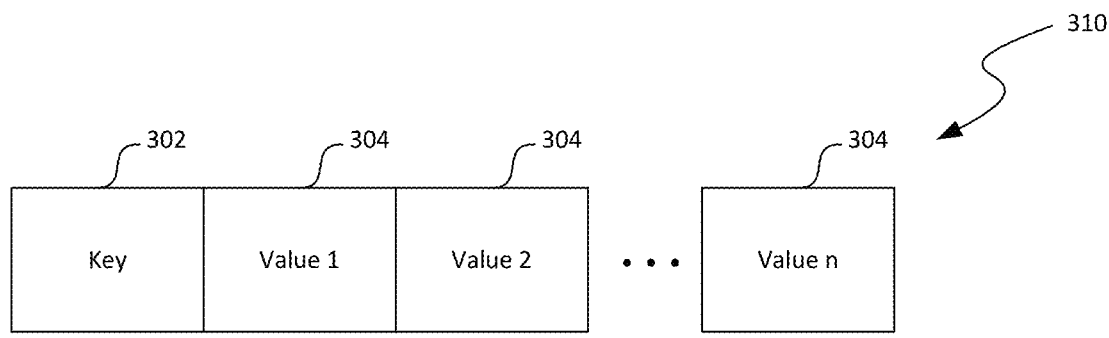

FIG. 6B is an example data schema 310 suitable for a distributed versioned dictionary in accordance with embodiments of the disclosed technology. As shown in FIG. 6B, the data schema 310 can include a key field 302 and a plurality of value fields 304 (illustrated as Value 1, Value 2, . . . , Value n). The key filed 302 can be configured to store a string value or other suitable types of key values. The value fields 304 can be configured to individually store an integer, a floating point, or other suitable types of number that correspond to a value in the key field 302 at a particular time, date, or version.

Figure 7:
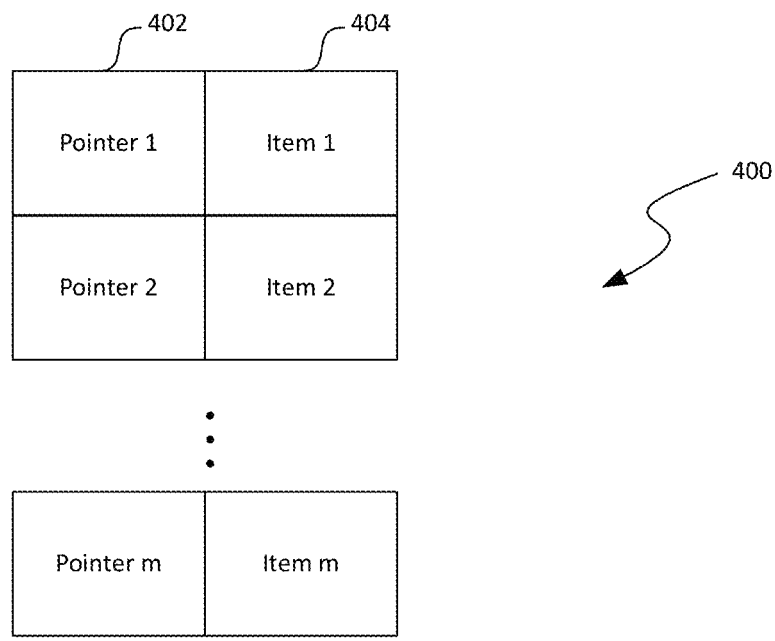
FIG. 7 is an example data schema suitable for a distributed queue in accordance with embodiments of the disclosed technology.

FIG. 7 is an example data schema 400 suitable for a distributed queue in accordance with embodiments of the disclosed technology. As shown in FIG. 7, the data schema 400 can include a plurality of pointer field 402 (illustrated as Pointer 1, Pointer 2, . . . , and Pointer m) and a plurality of corresponding item fields 404 (illustrated as Item 1, Item 2, . . . , Item m). The pointer fields 402 can be configured to individually store a pointer value. The item fields 304 can be configured to individually store an integer, a floating point, or other suitable types of data that correspond to a value in the corresponding pointer field 402.

Figure 8:
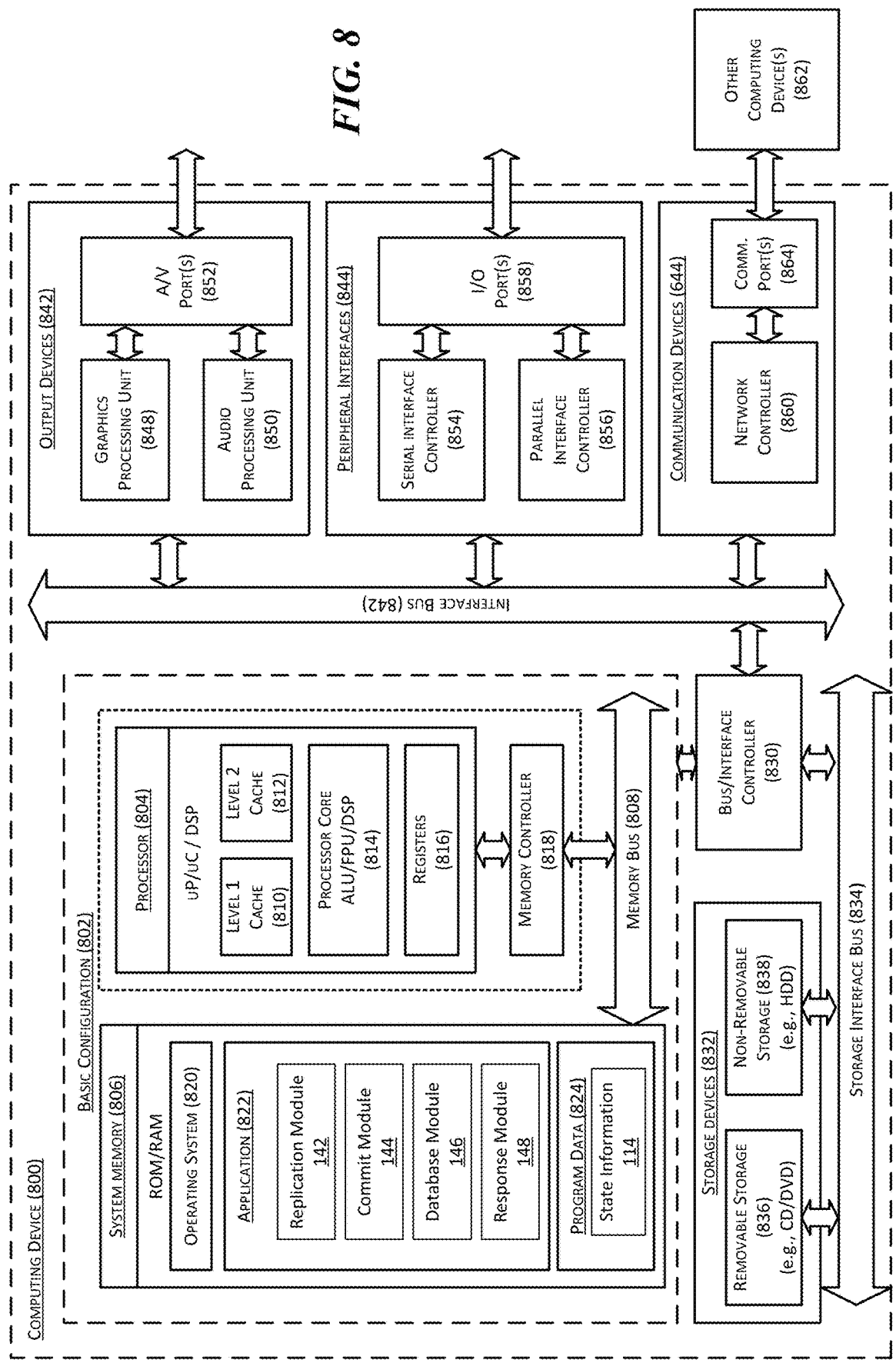
FIG. 8 is a computing device suitable for certain components of the computing framework in FIG. 1.

FIG. 8 is a computing device 800 suitable for certain components of the computing framework 100 in FIGS. 1-3. For example, the computing device 800 may be suitable for the client device 102, the primary node 104, or one of the secondary nodes 106a-106d of FIGS. 1-3. In a very basic configuration 802, computing device 800 typically includes one or more processors 804 and a system memory 806. A memory bus 808 may be used for communicating between processor 804 and system memory 806.

Depending on the desired configuration, the processor 804 may be of any type including but not limited to a microprocessor (pP), a microcontroller (pC), a digital signal processor (DSP), or any combination thereof. The processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, one or more application 822, and program data 824. The application 822 can include, for example, the replication module 142, the commit module 144, the database module 146, and/or the response module 148. The program data 824 may include, for example, state information 114. This described basic configuration 802 is illustrated in FIG. 8 by those components within the inner dashed line.

The computing device 800 may have additional features or functionality, and additional interfaces to facilitate communications between basic configuration 802 and any other devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, removable storage devices 836, and non-removable storage devices 838 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 800. Any such computer readable storage media may be a part of computing device 800. The term "computer readable storage medium" excludes propagated signals and communication media.

The computing device 800 may also include an interface bus 840 for facilitating communication from various interface devices (e.g., output devices 842, peripheral interfaces 844, and communication devices 846) to the basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 800 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A computing device having a processor and a memory, the memory storing computer-executable instructions executable by the processor to cause the computing device to:
   execute, with the processor, a software application at the computing device, thereby modifying a parameter values of corresponding state information of the software application persistently stored in the computing device as a data item in a first copy of a distributed data structure having the data item and multiple additional data items holding additional parameter values and with pointers pointing to each of the data item and the multiple additional data items; and
   in response to modifying the data item in the first copy of the distributed data structure, generate and transmit, at the computing device, an instruction to another computing device interconnected to the computing device via a computer network while continue to execute the software application at the computing device, the another computing device containing a second copy of the distributed data structure storing another copy of the state information of the software application, the transmitted instruction containing the modified parameter value of the data item in the first copy and the pointer corresponding to the data item, wherein the instruction indicates to the another computing device to (i) perform the same modification to another data item in the second copy of the distributed data structure corresponding to the pointer in the transmitted instruction as that performed to the first copy of the distributed data structure and (ii) locking an entry corresponding to the pointer in the second copy of the distributed data structure to prevent other operations from being performed on the second copy of the distributed data structure.

2. The computing device of claim 1, wherein the memory contains additional computer-executable instructions executable by the processor to cause the computing device to:
   receive a confirmation from the another computing device, the confirmation indicating that the modification is performed on the second copy stored on the another computing device.

3. The computing device of claim 1, wherein the memory contains additional computer-executable instructions executable by the processor to cause the computing device to:
   receive a confirmation from the another computing device, the confirmation indicating that the modification is performed on the second copy stored on the another computing device, and wherein the confirmation includes a conditional result.

4. The computing device of claim 1, wherein the memory contains additional computer-executable instructions executable by the processor to cause the computing device to:
   generate and transmit a commit instruction to the another computing device, the commit instruction indicating to the another computing device to persistently store the modified second copy on the another computing device.

5. The computing device of claim 1, wherein the memory contains additional computer-executable instructions executable by the processor to cause the computing device to:
receive a confirmation from the another computing device, the confirmation indicating that the modification is performed on the second copy on the another computing device; and
generate and transmit a commit instruction to the another computing device based on the received confirmation, the commit instruction indicating to the another computing device to persistently store the modified second copy on the another computing device.

6. The computing device of claim 1 wherein:
the first and second copies of the state information include first and second copies of one of a distributed blocking queue or a distributed queue slim.

7. The computing device of claim 1 wherein the memory contains additional computer-executable instructions executable by the processor to cause the computing device to:
generate and transmit an instruction to enqueue a data item to the second copy of the distributed data structure on the another computing device.

8. The computing device of claim 1 wherein the memory contains additional computer-executable instructions executable by the processor to cause the computing device to:
generate and transmit an instruction to dequeue a data item from the second copy of the distributed data structure on the another computing device.

9. A method performed in a computing facility having first and second computing devices individually having a processor, the method comprising:
executing a software application at the first computing device to perform a modification to a first copy of state information associated with the software application and stored in the first computing device, wherein the first copy of state information includes a first copy of a distributed data structure and contains a changed parameter value produced by the executed software application as a data item in the distributed data structure having a corresponding pointer; and
in response to the changed parameter value in the data item of the first copy of the state information at the first computing device, while continue to execute the software application at the first computing device,
transmitting, from the first computing device to a second computing device interconnected to the first computing device via a computer network, data representing the changed parameter value and the pointer corresponding to the data item holding the changed parameter value, the second computing device storing a second copy of the same state information associated with the software application executing on the first computing device; and
generating and transmitting, from the first computing device to the second computing device, an instruction to the second computing device to (i) perform the same modification to another data item in the second copy of the distributed data structure corresponding to the pointer as that performed to the first copy of the distributed data structure and (ii) locking an entry corresponding to the pointer in the second copy of the distributed data structure to prevent other operations from being performed on the second copy of the distributed data structure; and
in response to and in accordance with the transmitted instruction, at the second computing device, performing the same modification to another parameter value in another data item in the second copy of the state information on the second computing device according to the pointer as that performed to the first copy of the state information on the first computing device while locking the entry corresponding to the pointer.

10. The method of claim 9, further comprising:
receiving, at the first computing device, a confirmation from the second computing device, the confirmation indicating that the modification is performed successfully on the second copy of the state information stored on the second computing device.

11. The method of claim 9, further comprising:
receiving, at the first computing device, a confirmation as a conditional result from the second computing device, the confirmation indicating that the modification is performed successfully on the second copy of the state information stored on the second computing device.

12. The method of claim 9, further comprising:
generating and transmitting, at the first computing device, a commit instruction to the second computing device, the commit instruction indicating to the second computing device to persistently store the second copy of the state information with the modification on the second computing device.

13. The method of claim 9, further comprising:
receiving, at the first computing device, a confirmation from the second computing device, the confirmation indicating that the modification is performed successfully on the second copy of the state information stored on the second computing device; and
generating and transmitting, at the first computing device, a commit instruction to the second computing device based on the received confirmation, the commit instruction indicating to the second computing device to persistently store the second copy of the state information with the modification on the second computing device.

14. A method performed in a computing facility having a plurality of computing devices interconnected via a communications network, the method comprising:
executing a software application at a computing device of the computing facility, thereby resulting in a change to a portion of a copy of state information associated with the software application and persistently stored at the computing device in a distributed data structure, the copy of the state information containing one or more parameter values produced or modified by the executed software application; and
in response to the resulted change to the portion of the copy of the state information persistently stored at the computing device, automatically replicating, from the computing device to one or more other computing devices in the computing facility, the change to the portion of the copy of state information to the one or more other computing devices in the computing facility while continue to execute the software application at the computing device, the one or more other computing devices individually persistently storing a copy of the state information associated with the software application executing on the computing device, wherein automatically replicating includes:

transmitting data representing the change and a pointer corresponding to the change in the distributed data structure to the one or more other computing devices; and along with the data, transmitting an instruction to lock an entry corresponding to the pointer in the distributed data structure of the individual copies of the state information at the one or more other computing devices while replicating the change to the individual copies of the statement information.

15. The method of claim 14, further comprising:

receiving, from the one or more other computing devices, one or more confirmation indicating a success in replicating the change to the copies of the state information stored individually on the one or more computing devices; and transmitting another instruction to the one or more other computing devices, the another instruction indicating to the one or more other computing devices to persistently store the copies of the state information with the change on the one or more other computing devices.

16. The method of claim 14 wherein the copies of the state information include copies of one of a distributed dictionary, a distributed versioned dictionary, a distributed blocking data structure, a distributed data structure slim, a distributed stack, or a distributed bag.

17. The method of claim 14 wherein automatically replicating the change is asynchronous to other processes performed by the computing device.

18. The method of claim 14, further comprising:

receiving, at the computing device, a confirmation from the one or more other computing devices, the confirmation indicating that the modification is performed successfully on the copy of the state information stored on the one or more other computing devices.

19. The method of claim 14, further comprising:

receiving, at the computing device, a confirmation as a conditional result from the one or more other computing devices, the confirmation indicating that the modification is performed successfully on the second copy of the state information stored on the one or more other computing devices.

20. The method of claim 9, further comprising:

generating and transmitting, at the computing device, a commit instruction to the one or more other computing devices, the commit instruction indicating to the one or more other computing devices to persistently store the corresponding copy of the state information with the modification on the one or more other computing devices.

* * * * *